US009435998B1

United States Patent
Bibas et al.

(10) Patent No.: US 9,435,998 B1
(45) Date of Patent: Sep. 6, 2016

(54) BEAM DIRECTOR

(71) Applicants: Charles Bibas, Great Neck, NY (US); Deon Pieter Hugo, Pretoria (ZA); Nianqing Zhou, Atlantic City, NJ (US)

(72) Inventors: Charles Bibas, Great Neck, NY (US); Deon Pieter Hugo, Pretoria (ZA); Nianqing Zhou, Atlantic City, NJ (US)

(73) Assignee: Charles Bibas, Great Neck, NY (US)

( * ) Notice: Subject to any disclaimer, the term of this patent is extended or adjusted under 35 U.S.C. 154(b) by 0 days.

(21) Appl. No.: 14/848,056

(22) Filed: Sep. 8, 2015

Related U.S. Application Data

(60) Provisional application No. 62/175,402, filed on Jun. 14, 2015.

(51) Int. Cl.
 *G02B 26/08* (2006.01)
 *G02B 26/10* (2006.01)
 *B33Y 30/00* (2015.01)
 *B33Y 10/00* (2015.01)

(52) U.S. Cl.
 CPC ......... *G02B 26/0816* (2013.01); *G02B 26/105* (2013.01); *B33Y 10/00* (2014.12); *B33Y 30/00* (2014.12)

(58) Field of Classification Search
 CPC G02B 26/08; G02B 26/0816; G02B 26/101; G02B 5/08; G02B 27/0172; G02B 27/017; G06K 7/10683; G06K 7/10831

USPC ......... 359/196.1–226.2; 219/121.6, 219/121.67–121.74, 121.8; 235/462.36, 235/462.38, 472.01

See application file for complete search history.

(56) References Cited

U.S. PATENT DOCUMENTS

| 4,699,447 A | * | 10/1987 | Howard | G06K 7/10693 359/203.1 |
| 5,408,352 A | * | 4/1995 | Peng | G06K 7/10871 235/462.38 |
| 5,434,696 A | * | 7/1995 | Watson | G02B 26/10 359/201.1 |

* cited by examiner

*Primary Examiner* — James Phan

(57) ABSTRACT

A beam director comprising; a first reflector mounted towards the center of a horizontal rotatable platform, the platform rotatable by an actuator, the beam director configured to receive a vertical beam from a beam source perpendicular to the ratable platform and the first reflector configured to rotate the beam as the platform rotates and to reflect the beam horizontally to a second reflector mounted on the rotatable platform; the second reflector configured to reflect the beam vertically towards a work surface so that when the beam is activated and the actuator rotates the platform, the vertical beam strikes the rotating first reflector rotating the beam as the platform rotates and reflects the beam to the second reflector which reflects the beam to the work surface; the beam then following a curve path relative to the work surface and trace out an arc on the work surface.

23 Claims, 16 Drawing Sheets

BEAM DIRECTOR

APPLICATION

This application incorporates by reference and claims priority to and the benefit of, U.S. Provisional Patent Application Ser. No. U.S. 62/175,402 with filing or 371(c) date of Jun. 14, 2015.

FIELD OF THE INVENTION

The present invention relates to apparatus and methods for directing a beam for printing, plotting, drawing, engraving, welding and sintering of objects. It further relates to the creation of three dimensional objects by laying subsequent layers of material on top of each other.

BACKGROUND

Beam directors in three dimensional (3-D) printers and scanners contain galvanometer servo motors and linear actuators to drive and direct mirrors and crystals in order to deflect and direct beams. The printing and scanning speed is therefore limited mainly by galvanometer and actuator speed.

A galvanometer servo motor is limited to max scan speed of about 2.5 KHz. Galvanometer servo motors also have about 5-10 micro radian positioning error. This error becomes more prominent as the target distance from the galvanometer servo motor driven mirror increases. In addition a galvanometer servo tends to shudder when it reaches its destiny and therefore presents settling down unwanted noise.

Linear actuators can be used to eliminate galvanometer errors. However if linear actuators are used then their full forward and backward speed cycle is limited due to slow acceleration and deceleration caused by their inertia.

Another common method of Laser scanning and printing is the use of polygon mirrors. Polygon mirrors can be used to direct the beam in one dimension, while the second dimension can be implemented by a linear actuator or a galvanometer. Although, Polygon mirrors improves on the galvanometer speed limitation, they will contribute additional distortion due to the geometry of the mirrors while non-linear mapping of the beam from the input to the output field takes place. In addition, all polygon mirrors must be completely identical. Both the X-Y-axis galvanometer and polygon mirrors techniques suffer further distortions due to the f-theta lens imperfection. The use of f-theta contributes two additional errors:
1. The beam angle to the normal of the surface will grow as it travels away from the center of the lens, causing an elliptic like beam formation instead of a circle.
2. The optic conversion errors of f-theta will grow as the beam travels away from the center of the lens; the optic conversion of tan(theta) will grow non linear as theta grows.

The object of this invention is to mitigate the problems discussed above.

SUMMARY

This invention relates to a beam director comprising; a vertical rotatable first reflector rotatable upon itself by an actuator; the beam director configured to receive a vertical beam from a beam source along the rotational axis of the first reflector and directed towards the first reflector; the first reflector configured to rotate the vertical beam as it rotates and to reflect the beam horizontally to a second reflector; which is rotatable by the actuator in a circle around the vertical rotational axis of first reflector as first reflector rotates; so that second reflector constantly facing first reflector; the second reflector further configured to reflect the beam vertically towards a work surface; so that when the beam is activated and the actuator rotates the first reflector; the vertical beam strikes the rotating first reflector; rotating the beam as it rotates and reflects the beam to the second reflector; which reflects the beam to the work surface; the beam then follows a curve path relative to the work surface and trace out an arc on the work surface.

A further aspect of the invention is that the radial distance between the first and the second reflector is adjustable so that by adjustment the distance the beam travels from the first to the second reflector is varied so that correspondingly due to adjustment the beam follows a curve path of adjustable radii relative to the work surface and trace out arcs of adjustable radii on the work surface.

A further aspect of the invention is that the second reflector is a slanted annular reflecting surface horizontally encircling the first reflector; stationary and having the same vertical axis as the rotational axis of the first reflector; the slanted annular reflecting surface having a large and small diameter, the large diameter directed towards the work surface so that when the beam is activated and the actuator rotates the first reflector; the vertical beam strikes the rotating first reflector rotating the beam as it rotates and reflects the beam to the second reflector which reflects the beam to the work surface; the beam then following a curve path relative to the work surface and trace out an arc on the work surface.

Another aspect of the invention relates to the second reflector being cone shaped; encircling first reflector and having the same vertical axis as the rotational axis of the first reflector; the second reflector being rotationally stationary relative to the first reflector; the larger diameter of the second reflector directed towards the work surface and configured to reflect a beam from the first reflector towards the work surface; the second reflector being vertically adjustable relative to the first reflector; so that by adjustment of the second reflector the distance the beam travels from the first to the second reflector is adjusted due to the conical shape of the second reflector so that correspondingly due to adjustment the beam follows a curve path of adjustable radii relative to the work surface and trace out arcs of adjustable radii on the work surface.

Another aspect of the invention is that the beam source is inside the beam director.

Another aspect of the invention is that the beam source is attached to the beam director.

Another aspect of the invention is that the beam is conveyed to the beam director with a beam conduit.

Another aspect of the invention is that the beam director has a third reflector which is configured to receive a horizontal beam from a beam source and configured to reflect the beam vertically towards the first reflector.

A further aspect of the invention is that first and second reflectors are connected by an arm.

A further aspect of the invention is that the rotation of first and second reflectors are stabilized by attaching a stabilizing member.

Another aspect of the invention is that the reflectors are housed in an aerodynamic housing where the airflow is controlled.

A further aspect of the invention is that the beam director can be used as a print head for a three dimensional printer.

This invention is also a method of directing a beam with a beam director towards a work surface, the method comprising:
generating a beam with a beam generator;
rotating a first reflector vertically upon itself with an actuator;
directing the beam towards the first reflector along the rotational axis of first reflector;
rotating with the actuator a second reflector to encircle the rotational axis of first reflector as first reflector rotates and second reflector constantly facing first reflector;
reflecting the beam horizontally with the first reflector towards the second reflector;
reflecting the beam vertically with the second reflector towards the work surface; so that when the beam is activated and the actuator rotates the first and second reflector; the vertical beam strikes the rotating first reflector rotating the beam as it rotates and reflects the beam to the second reflector which reflects the beam to the work surface; the beam then following a curve path relative to the work surface and trace out an arc on the work surface.

A further aspect of the invention is that the method further includes adjusting the distance between the second reflector and the first reflector so that by adjustment the distance the beam travels from the first to the second reflector is adjusted so that correspondingly due to the adjustment the beam follows a curve path of adjustable radii relative to the work surface and trace out arcs of adjustable radii on the work surface.

The method further includes reflecting the beam vertically towards the work surface with a second reflector that has a slanted annular reflecting surface horizontally encircling the first reflector; stationary and having the same vertical axis as the rotational axis of the first reflector; the annular reflecting surface having a large diameter and a small diameter; the large diameter directed towards the work surface; the so that when the beam is activated and the actuator rotates the first reflector; the vertical beam strikes the rotating first reflector rotating the beam as it rotates and reflects the beam to the second reflector which reflects the beam to the work surface; the beam then following a curve path relative to the work surface and trace out an arc on the work surface.

In another aspect of the invention the method further includes reflecting the beam vertically towards the work surface with a second reflector that is cone shaped; encircling first reflector and having the same vertical axis as the rotational axis of the first reflector; the second reflector being rotationally stationary; the larger diameter of the second reflector directed towards the work surface; the second reflector being vertically adjustable relative to the first reflector; so that by adjustment of the second reflector the distance the beam travels from the first to the second reflector is adjusted due to the conical shape of the second reflector so that correspondingly due to adjustment the beam follows a curve path of adjustable radii relative to the work surface and trace out arcs of adjustable radii on the work surface.

Another aspect of the invention is that the method further includes attaching the beam source to the beam director.

Another aspect of the invention is that the method further includes conveying the beam to the beam director with a beam conduit.

Another aspect of the invention is that the method further includes connecting first second reflectors by an arm.

The method further includes stabilizing the rotation of first and second reflectors by adding a stabilizing member.

Another aspect of the invention is that the method further includes housing the first and second reflectors in an aerodynamic member where the airflow is controlled.

Another aspect of the invention is that the method further includes reflecting a horizontal beam with a third reflector vertically towards the first reflector along the rotational axis of first reflector.

Another aspect of the invention is that the method further includes using the beam director as a print head for a three dimensional printer.

BRIEF DESCRIPTION OF THE DRAWINGS

The invention will now be further described with reference to the attached drawings.

Table with Reference Numerals and Description

| | |
|---|---|
| 101 | 3-D printer. |
| 102 | x-axis stage. |
| 103 | pillar. |
| 104A | first y-axis stage. |
| 104B | second y-axis stage. |
| 105 | beam director |
| 106A | bottom mirror |
| 106B | top mirror |
| 106C | x-axis stage mirror |
| 106D | third mirror |
| 106E | first mirror |
| 106EP | first prism angled side |
| 106F | second mirror |
| 106FP | second angled prism side |
| 107 | beam |
| 107A | focusing beam |
| 107B | point where beam strikes build surface |
| 108 | motor |
| 109 | rotor disk |
| 110 | housing |
| 111 | opening |
| 112 | focus lens |
| 113 | work surface |
| 114 | beam source |
| 115 | hole |
| 116 | radial slide |
| 117 | radial exit slit |
| 118 | support |
| 120 | radial actuator |
| 121A | rhomboid prism |
| 121B | rotor prism platform |
| 123 | cone motor |
| 124 | threaded shaft |
| 125 | arm |
| 125A | dummy arm |
| 125B | arm mount |
| 125C | motor shaft socket |
| 125D | index hole (notch) |
| 125E | index hole (notch) |
| 126 | support base |
| 127A | first guide rode |
| 127B | second guide rode |
| 128A | first guide hole |
| 128B | second guide hole |
| 128C | threaded hole |
| 129 | cone member |
| 129A | cone reflector |
| 131 | annular reflective surface member |
| 132 | slanted annular reflective surface |
| 133 | motor support |
| 134 | inside prism wall |
| 135 | outer prism wall |
| 136 | bearing |
| 137 | motor gear |
| 138 | hollow shaft |
| 138A | first mirror gear |
| 139 | bottom prism wall |

DESCRIPTION OF DRAWINGS

The present invention will be described with reference to the drawings. Various refinements and substitutions are possible based on the principles and teachings herein.

Figure 1:
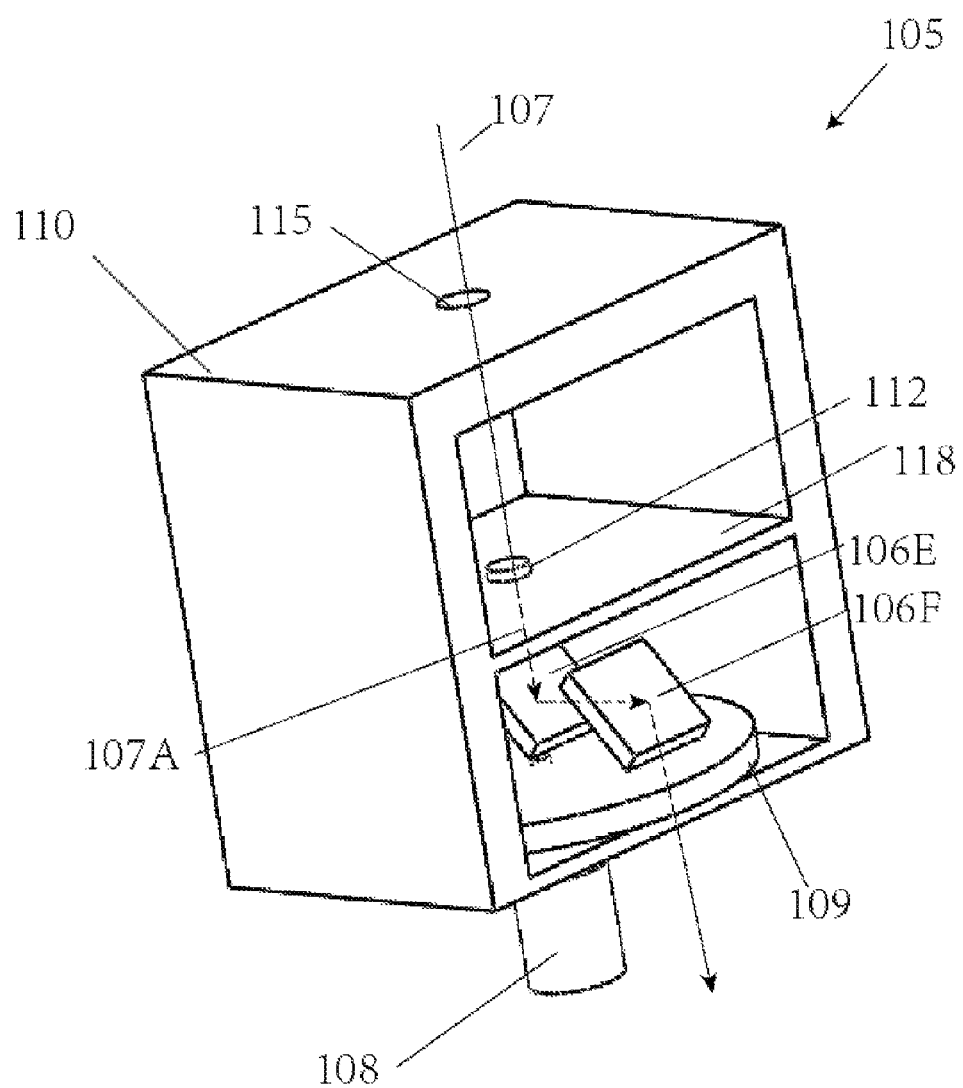
FIG. 1: shows an embodiment of the beam director receiving a vertical beam and the subsequent beam path.
Figure 7:
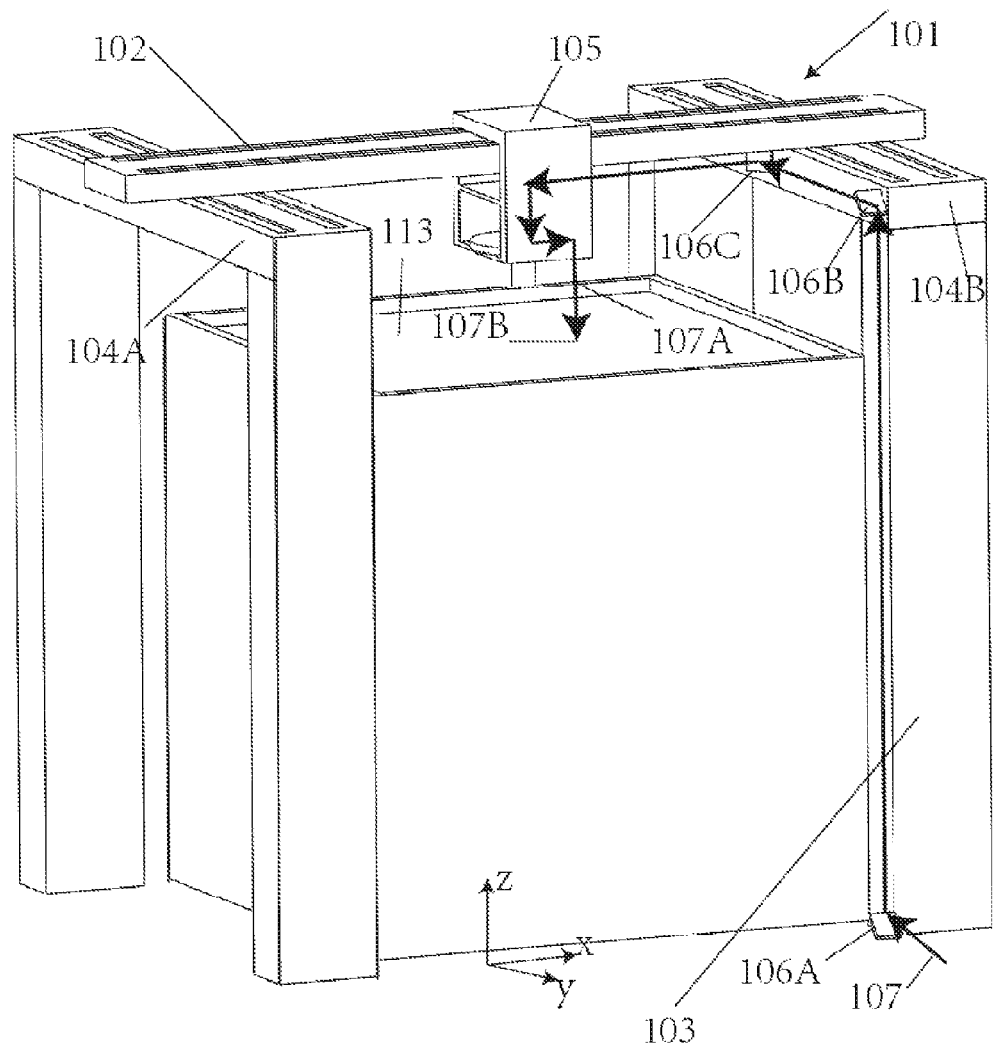
FIG. 7: shows the beam director installed in a 3-D printer.

With reference to FIG. 1 beam director 105 has hole 115 on top of housing 110 and focus lens 112 located in support 118. First mirror 106E which is located towards the center of rotatable rotor disk 109. Rotor disk 109 is rotated by motor 108. First mirror 106E is orientated towards second mirror 106F and so configured to reflect focusing (beam is set to focus on work surface) beam 107A towards second mirror 106F. Second mirror 106F is located towards the edge of rotor disk 109 and mounted at an angle on rotor disk 109 and configured to reflect a beam towards work surface 113 which in the case of FIG. 7 is the build surface of a 3-D printer.

Figure 2:
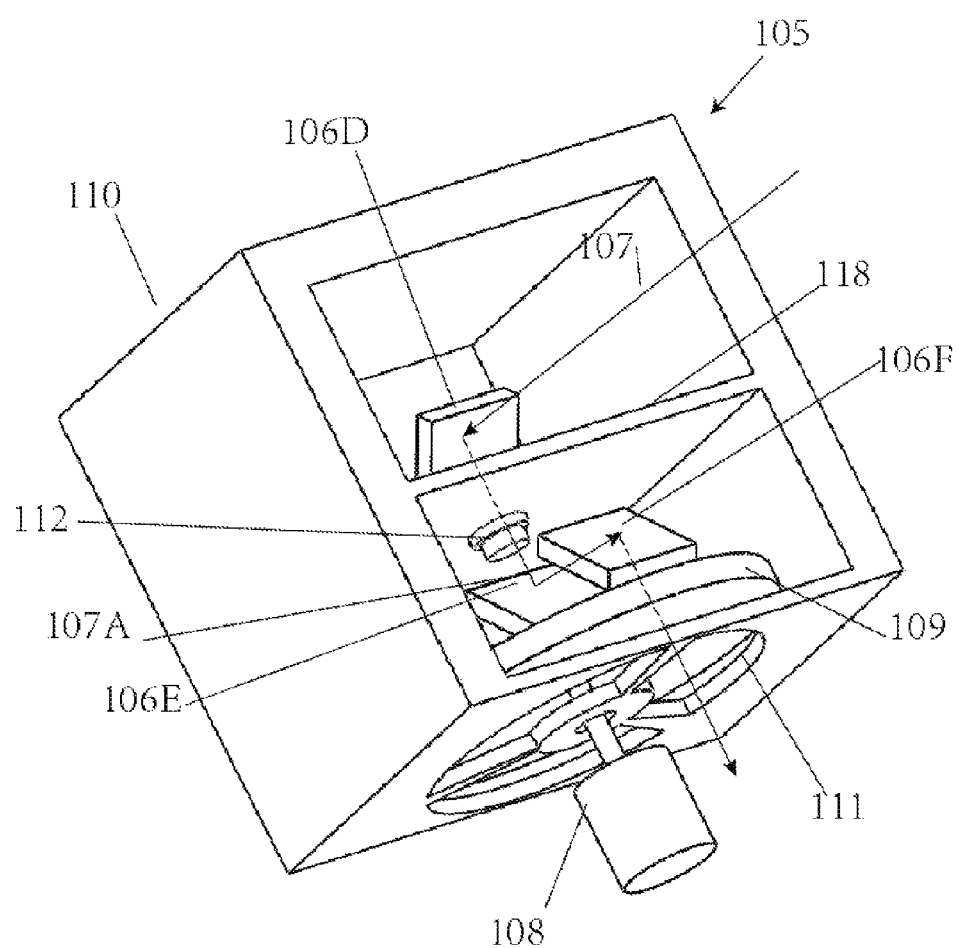
FIG. 2: shows an embodiment of the beam director receiving a horizontal beam and the path the beam follows.

When activated beam 107 enters beam director 105 through hole 115 and goes through lens 112 to be focused. Focusing beam 107A then strikes first mirror 106E. Motor 108 rotates rotor disk 109 and first mirror 106E and second mirror 106F mounted on rotor disk 109. Focusing beam 107A is then rotated and reflected towards second mirror 106F. From second mirror 106F beam 107A is then reflected vertically and then leaves beam director 105 through opening 111 as shown in FIG. 2. The beam 107A then continues to the work surface 113 as shown in FIG. 7 the beam then following a curve path relative to the work surface and trace out an arc on the work surface.

In FIG. 2 another embodiment of beam director 105 is shown. In this case beam director 105 has stationary third mirror 106D mounted at an angle on support 118. Third mirror 106D is directed towards lens 112 and configured to reflect horizontal beam 107 through lens 112 towards first mirror 106E. Once third mirror 106D reflects horizontal beam 107 vertically towards second mirror 106E through lens 112 focusing beam 107A follows the same path as described above and also exits beam director 105 through opening 111. The beam 107A then continues to the work surface 113 as shown in FIG. 7 the beam then following a curve path relative to the work surface and trace out an arc on the work surface.

Figure 3:
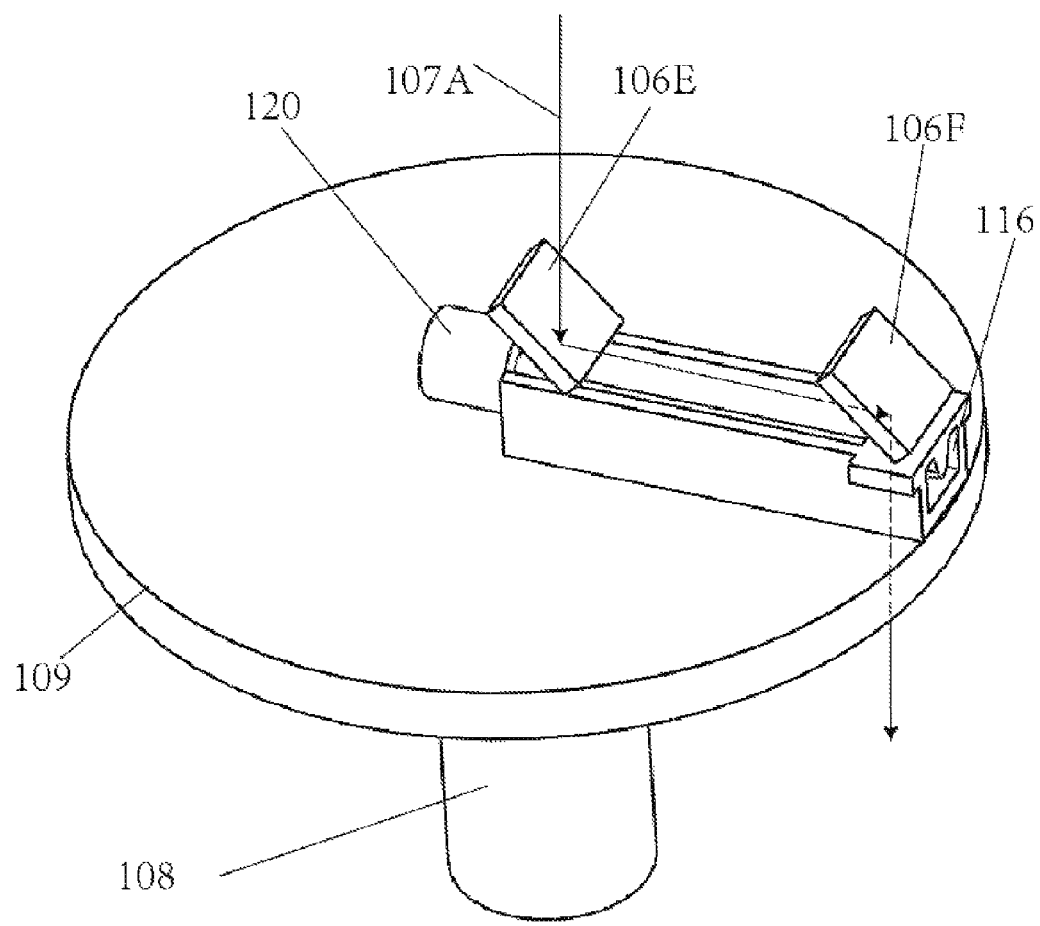
FIG. 3A: shows an embodiment of the invention where the second reflector displaceable relative to the first reflector and the path the beam follows.
FIG. 3B: shows a bottom view of the embodiment in FIG. 3A with a radial exit slit.
Figure 3B:
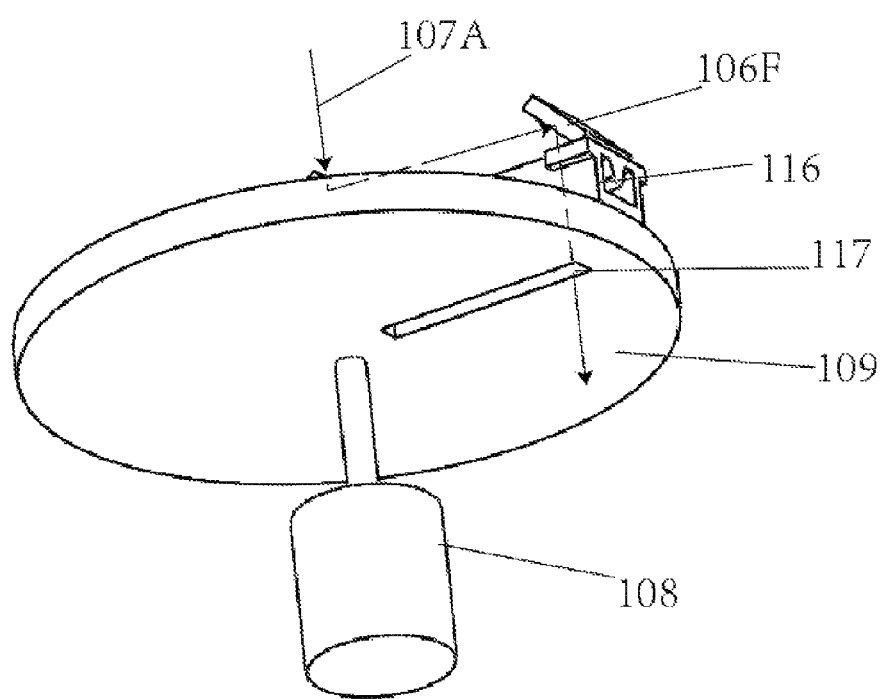

In FIG. 3A the embodiment is shown with the housing 110, third mirror 106D and support 118 with lens 112 removed to better illustrate a further feature of the invention. In this configuration second mirror 106F is adjustable relative to first mirror 106E. As is shown in FIG. 3A it is done with radial slide 116 driven by radial actuator 120. As can be seen in FIG. 3B focusing beam 107A exits through radial exit slit 117. By adjustment the distance the beam 107A travels from the first to the second mirror is adjusted so that correspondingly due to the adjustment the focusing beam 107A follows a curve path of adjustable radii relative to the work surface and trace out arcs of adjustable radii on the work surface 113 shown in FIG. 7. To keep the beam focused on the bed 113 either the beam 107A needs to be collimated or the cone angle should be 45 degrees.

Figure 4:
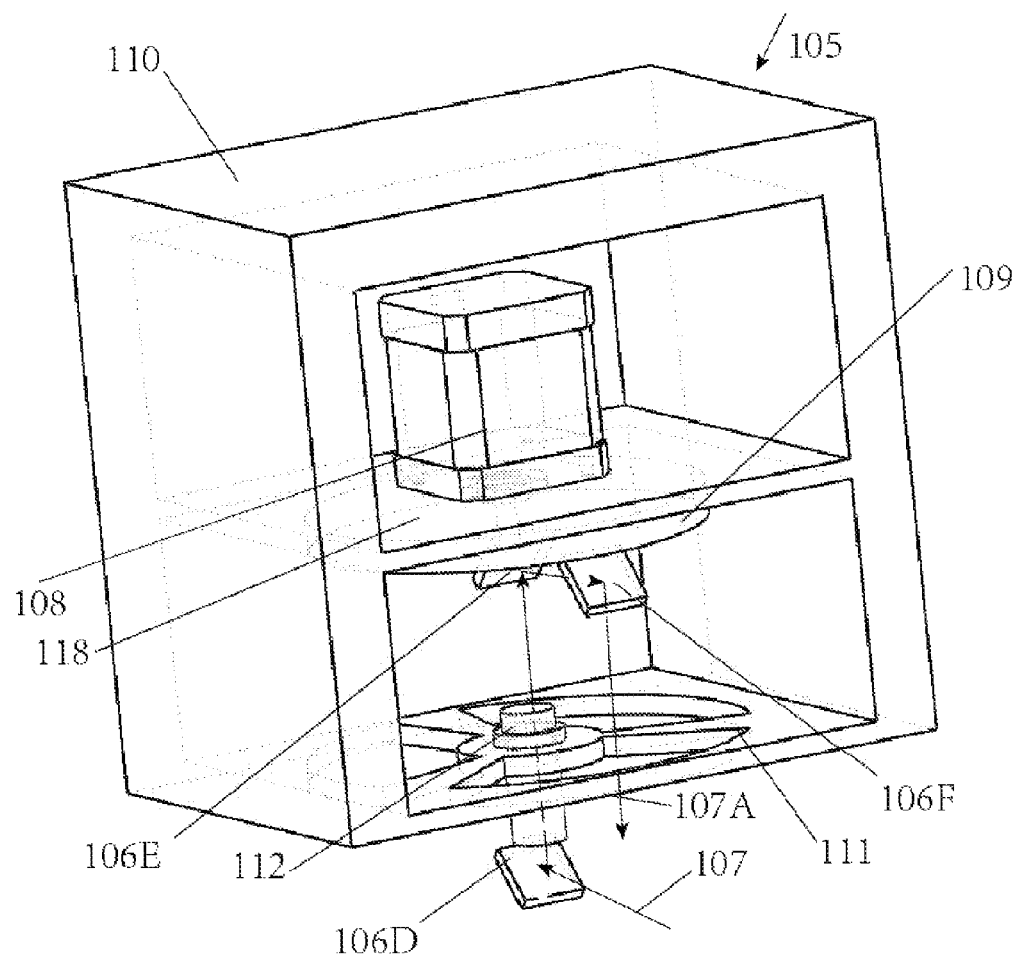
FIG. 4: shows another embodiment of the invention receiving a horizontal beam and the path of the beam.

FIG. 4 shows a another embodiment of the invention. In this case the beam director 105 is orientated upside down if compared as in FIG. 2 with motor 108 and rotor disk 109 towards the top. Second mirror 106F is differently orientated as compared with second mirror 106F in FIG. 2. In FIG. 4 second mirror 106F is toward the top and reflects beam 107 away from rotor disk 109 downwards towards work surface 113.

Figure 5:
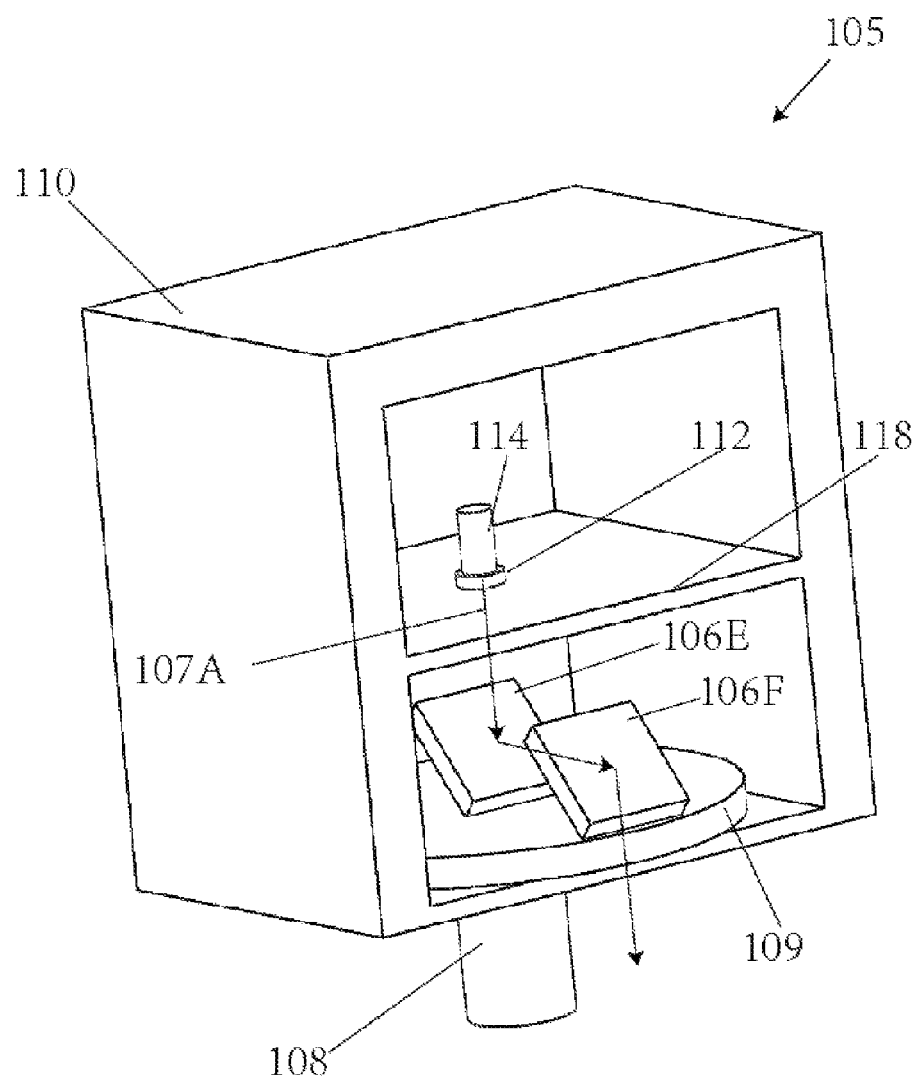
FIG. 5: shows another embodiment of the invention with the beam source directed downwards inside the beam director.

In FIG. 5 third mirror 106D is removed. The beam source 114 is inside the beam director 105 and is directed vertically downwards towards first mirror 106E. The focusing beam 107A then follows the same path in the print-head 105 as discussed above.

Figure 6:
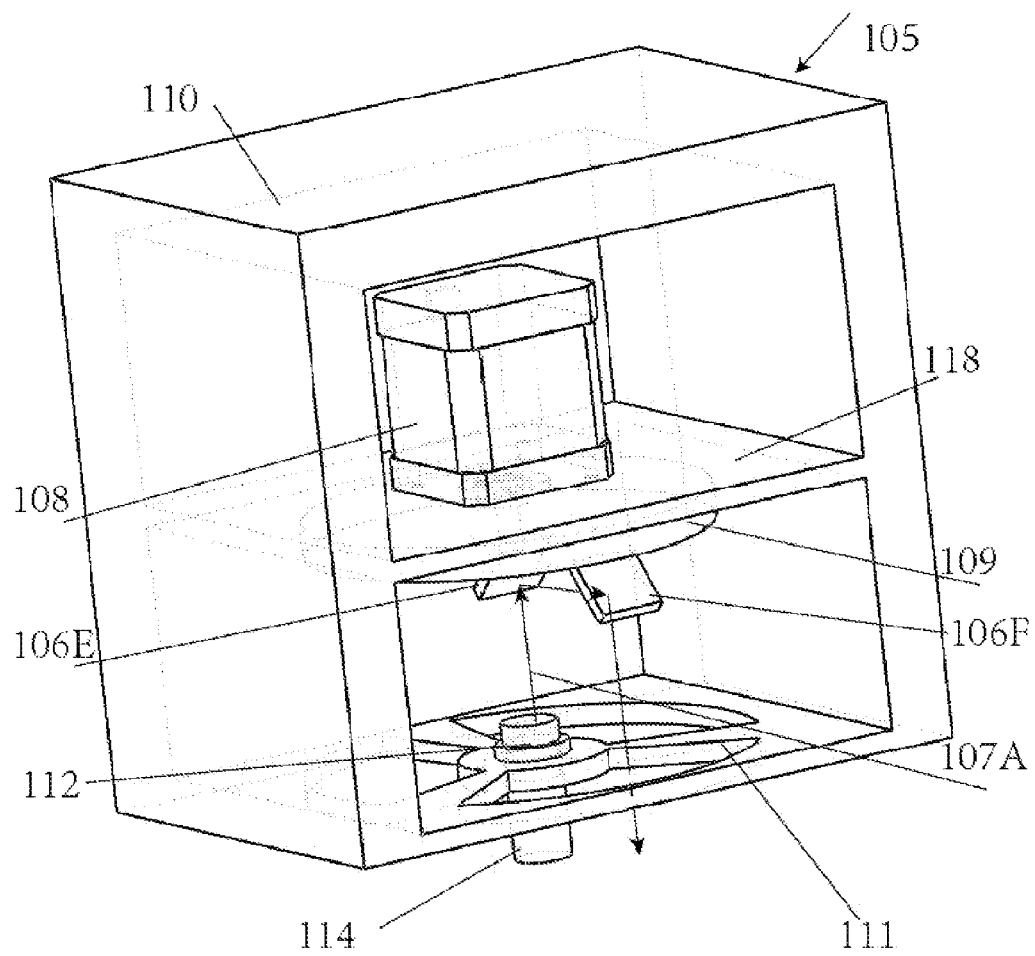
FIG. 6: shows another embodiment of the invention where the beam source is vertically directed upwards and attached to the beam director.

In FIG. 6 is shown beam director 105 similar to beam director shown in FIG. 5. In this configuration third mirror 106D is removed and a vertical external beam source 114 directed upwards towards first mirror 106E and attached housing 110 of beam director 105.

An object that is created by a 3-D printer is composed of small sections of material that is heated by a beam that strikes the material. The material then hardens as the material cools down. This invention due to the spinning action of the mirrors and the beam then following a curve path relative to the work surface and trace out arcs on the work surface small curved sections can be created. By activating beam and deactivating beam (modulating the beam) the small curved sections can be used to build up a printed object.

The modulation of the beam is done by computer control. A digital image of the object to be printed is loaded into the computer. The software in the computer then calculates the different subsequent layer patterns that has to be generated and printed in order to build up the object layer by layer.

With reference to FIG. 7 the beam director 105 is used as a print-head for a three (3-D) printer 101 and is installed on a positioning system of a 3-D printer. The positioning system in this case is an actuator driven X-Y axis gantry system. First y-axis stage 104A and second y-axis stage 104B are both supported by two pillars 103 at their ends. Between the pillars 103 a work surface 113 (the build surface of the 3-D printer) is located.

The x-axis stage 102 is perpendicular to first y-axis 104A and second y-axis stage 104B. The x-axis stage 102 moves back and forth along the y-axis stages. The beam director 105 located on the x-axis stage 102 and moves back and forth along the x-axis stage 102.

Bottom mirror 106A is located at the foot of pillar 103 and is orientated at an angle towards top mirror 106B and so configured to reflect beam 107 towards top mirror 106B which is located towards the top of pillar 103. Top mirror 106B is configured to reflect beam 107 towards x-axis stage mirror 106C. X-axis stage mirror 106C is configured to reflect a beam towards beam director 105.

It should be appreciated that there are numerous other arrangements of mirrors by which beam 107 can be directed towards the print head.

In this embodiment the beam director 105 as illustrated in FIG. 2 is used as print-head. Therefore beam 107 will therefore be directed towards third mirror 106D as shown in FIG. 2.

With reference to FIG. 7 when the beam source is activated the beam 107 strikes bottom mirror 106A and is reflected upwards towards top mirror 106B. The beam 107 is then reflected towards x-stage mirror 106C by top mirror 106B. X-stage mirror 106C then reflects beam 107 towards third mirror 106D of beam director 105 shown in FIG. 2

Beam 107 then follows the path in beam director 105 of FIG. 2 until focusing beam 107A exits beam director 105 as shown in FIG. 7.

Focusing beam 107A strikes the work surface 113 (build surface of the 3-D printer) at point 107B as shown in FIG. 7. Since focused beam 107A is rotated by first mirror 106E the focused beam 107A thus follows a curved path relative to the work surface and traces out an arc on the work surface 113.

After each rotation of rotor disk 109, the beam director 105 is moved by a beam width in the X-axis direction by the positioning system. The beam will now print a new curve next to the previous one. This will continue until the end of the object to be printed is reached in the X-axis direction. The beam director 105 will then be moved one curve width by the positioning system in the Y-axis direction. The beam director will then work its way back in the X-axis direction towards the opposite end of the object to be printed in the X-axis direction. Another aspect of the invention is to move X and Y simultaneously while the print head 105 is printing.

Once again when this end is reached the beam director will again be moved one curve width in the Y-axis direction and once more move along the X-axis in the opposite direction. This to and fro print action is continued until a whole layer of the object is complete. When the first layer is completed the work surface (or build surface of a 3-D printer) will be lowered in the z-axis direction by a layer thickness, and a new layer of powder will dispense over the present layer and the print process will start again for the new layer. The object will therefore be constructed by the printing of subsequent layers on top of each other.

Figure 8:
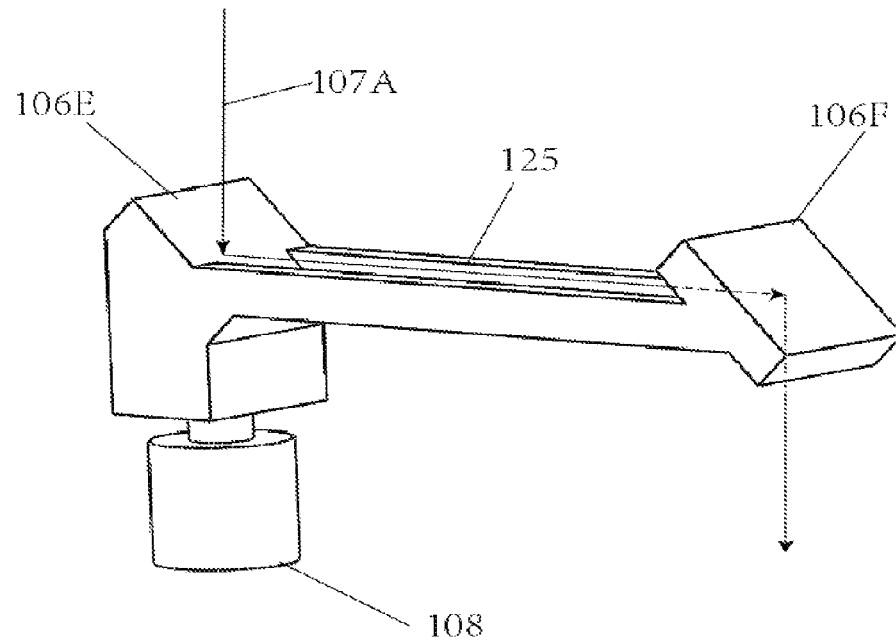
FIG. 8: shows another embodiment showing the mirrors connected by an arm.

In FIG. 8 is shown another embodiment where instead of a rotor disk 109 is used it is replaced with an arm 125. Arm 125 holds second mirror 106F horizontally in position relative to first mirror 106E.

Figure 9:
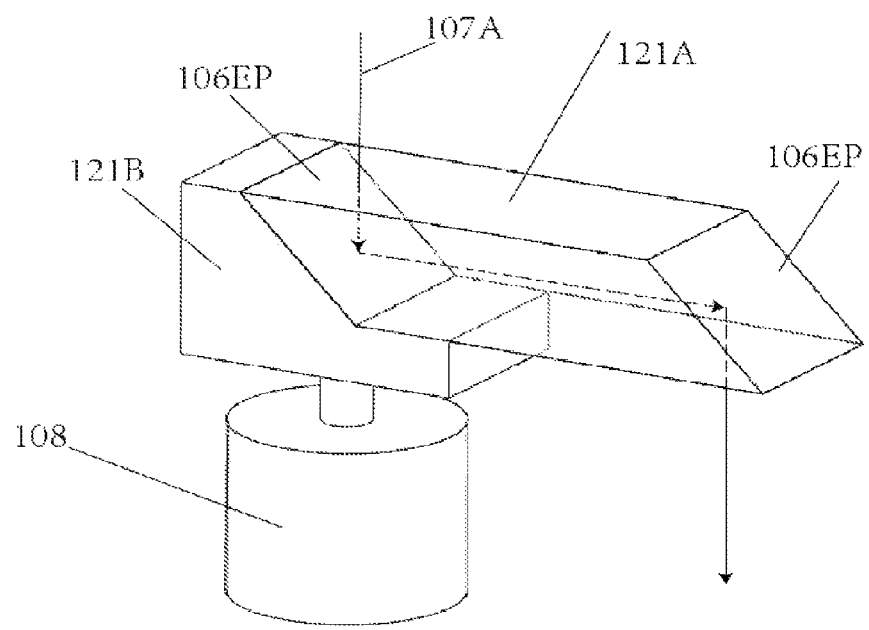
FIG. 9: shows another embodiment using a rhomboid prism.

In FIG. 9 is shown that instead of rotor disk 109 rotor prism platform 121B on which rhomboid prism 121A is mounted on, is used. The first angled prism side 106EP and second angled prism side 106FP in this case act as first and second mirrors 106E and 106F.

Figure 10:
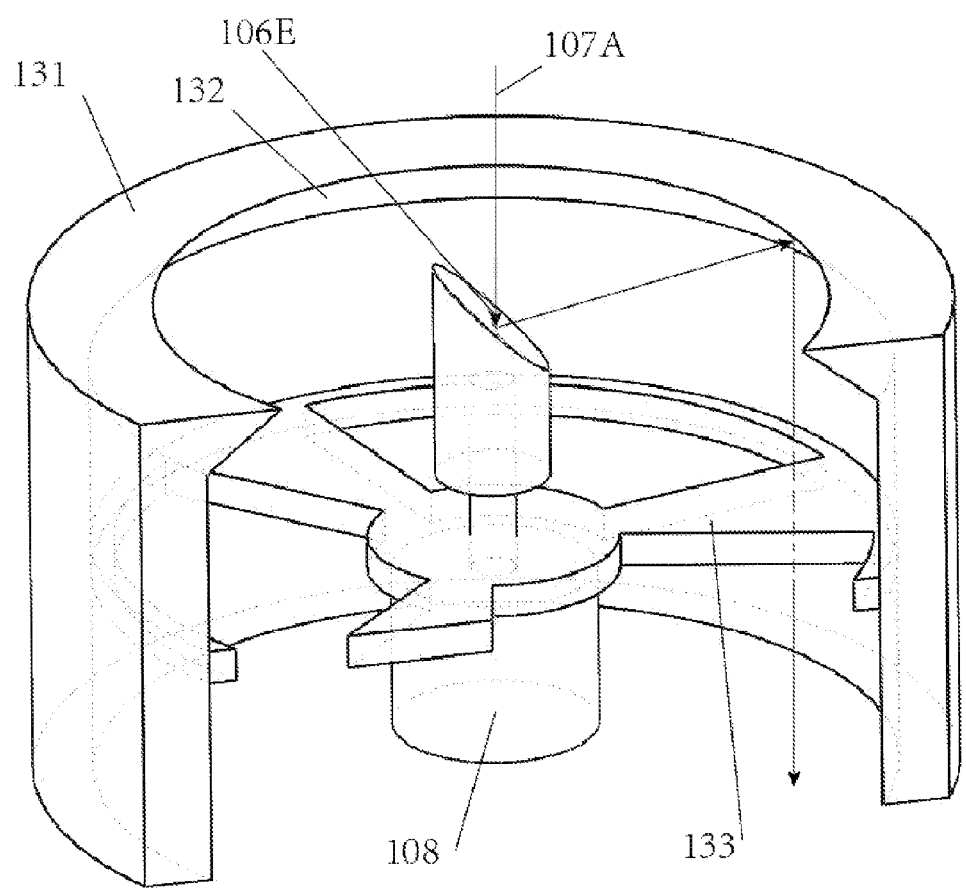
FIG. 10: shows another embodiment with the second reflector being a slanted annular reflecting surface.

In FIG. 10 is shown second mirror 106F has a slanted annular reflective surface 132 (shaped similar to a horizontal slice out of a cone) which is supported by annular reflective surface member 131. Slanted annular reflective surface 132 horizontally encircles the first mirror 106E is stationary and has the same vertical axis as the rotational axis of the first mirror 106E. First mirror 106E is rotated by motor 108 which is held in position by motor support 133. Annular reflective surface 132 has a large diameter and a small diameter. The large diameter is directed towards the work surface, is at an angle relative to the rotational axis of first mirror 106E and configured to reflect focusing beam 107A vertically towards the work surface. When focusing beam 107A strikes first mirror 106E and motor 108 rotates the first mirror 106E, first mirror 106E rotates the beam 107A as it rotates, and reflects the beam to slanted annular reflective surface 132 which reflects the focusing beam 107A to the work surface; the beam then follows a curve path relative to the work surface and trace out an arc on the work surface.

Figure 11:
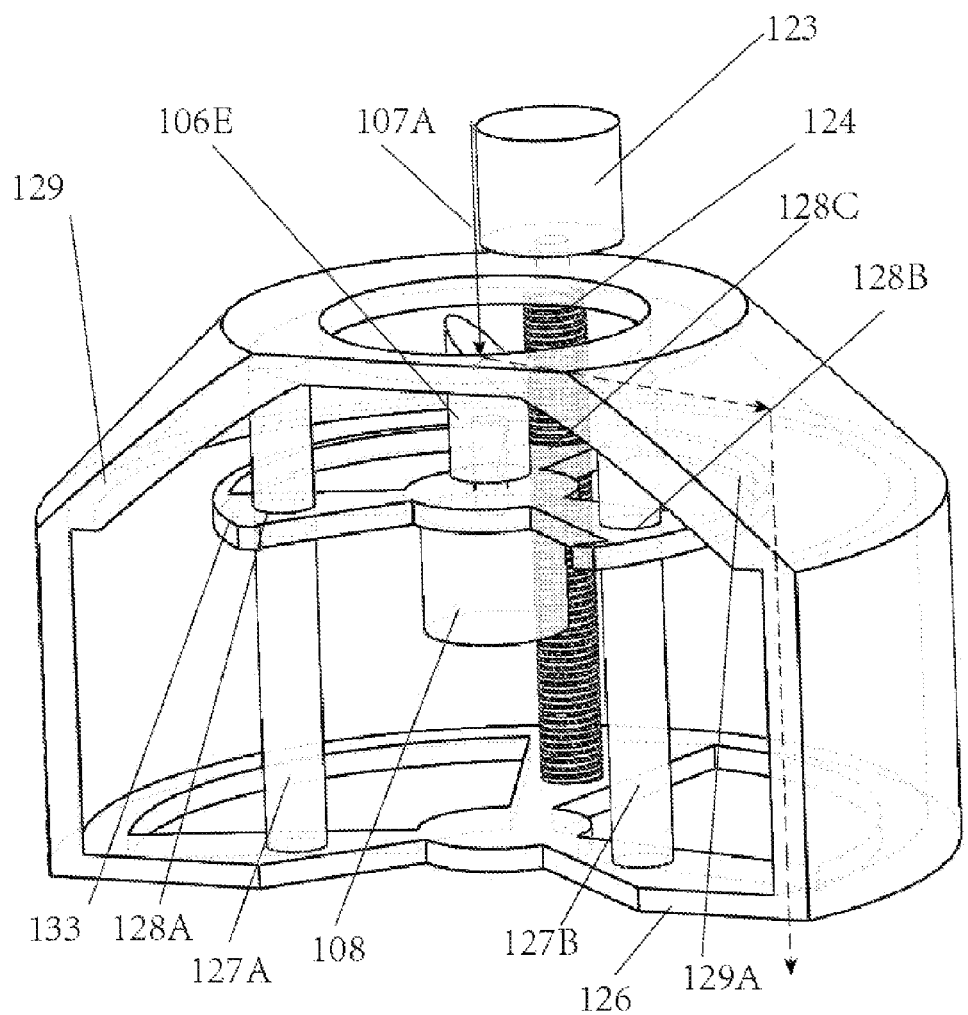
FIG. 11: shows another embodiment with cone reflector with variable radius actuator.

In FIG. 11 is an embodiment where the second mirror 106F is cone shaped and cone reflector 129A is the inner cone reflective surface of cone member 129. Cone reflector 129A encircles first reflector 106E and has the same vertical axis as the rotational axis of the first mirror 106E. The cone reflector 129A is rotationally stationary. The larger diameter of cone reflector 129A is directed towards the work surface and configured to reflect a beam from the first reflector towards the work surface.

Cone member 129 has support base 126 with first guide rod 127A, and second guide rod 127B. Thread rod 124 rests on support base 126. Motor support 133 holds motor 108 in place and has first guide hole 128A through which guide rod 127A goes, second guide hole 128B through which guide rod 127B goes and threaded hole 128C through which threaded shaft 124 goes. The thread of threaded hole 128C engages the thread of threaded shaft 124. Cone motor 123 is connected to threaded shaft 124 and rotates threaded shaft 124. Motor 108 is connected to and rotates first mirror 106E.

When cone motor 123 is activated threaded rod 124 rotates and engages the thread of thread hole 128C and vertically displaces cone reflector 129A relative to first mirror 106E, while guide rods 127A and 127B stabilises and guides motor support 133. During displacement of cone reflector 129A relative first mirror 106E the focusing beam 107A strikes the cone reflector 129A and the distance (radius) focusing beam 107A travels from first mirror 106E to cone reflector 129A changes. Correspondingly the distance from the rotational axis of first mirror 106E that beam 107A leaves cone member 129 changes. Focusing beam 107A traces out arcs of varying radii on the work surface with the rotational axis of first mirror 106E as the origin of the radii. To keep the beam focused on the bed 113 either the beam 107A needs to be collimated or the cone angle should be 45 degrees.

Figure 12:
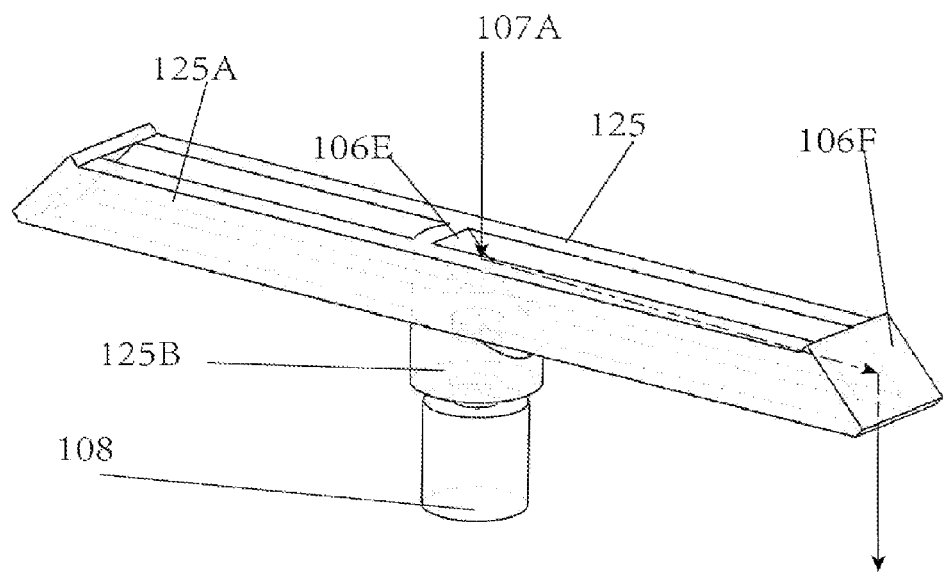
FIG. 12: shows another embodiment with a double arm configuration.

In the preferred embodiment in FIG. 12 vertical rotatable first mirror 106E is rotatable upon itself by motor 108 and receives a vertical focusing beam 107A. First mirror 106E rotates the vertical beam as it rotates and reflects the beam horizontally to a second mirror 106F at the end of arm 125. Arm 125 has opposing, stabilizing member, dummy arm 125A as a counter balance and to provide greater stability during rotation. Arms 125A and 125 are mounted on arm mount 125B. Second mirror 106F then reflects the focusing beam 107A vertically towards the work surface 113 in FIG. 7.

The beam 107 can be of any wave length or type of ray for example laser, light, x-ray or an infra-red light beam. It could also be a particle beam for instance a molecule, atom, ion, proton, neutron, isotope, electron, or any other subatomic particle.

The beam 107 could also be conveyed to the beam director 105 from a beam source outside the beam director via a beam fibre. In this invention the print speed is to a great extent only limited by the motor 108 rotational speed. There is no stop start action causing acceleration and deceleration during which print time is lost. Since the rotor disk 109, arm 125 on its own and arm 125 in combination with dummy arm 125A keeps rotating at a constant speed there is no need to slow down or reverse speed.

The print quality of the invention is improved as the beam strikes the work surface 113 (target) perpendicularly and therefore mitigating f-theta, galvanometer or/and polygon mirrors related errors.

Some of f-theta errors occurs when a beam strikes the target surface at an angle. In scanning and printing systems where the beam is directed by deflecting it form a mirror towards the target, the beam strikes the target at an angle. This causes f-theta distortion where the beam diameter changes a from circle to an elliptic shape.

Consider an ordinary lens with an imaginary lens axis in the same direction that the beam travels through the lens and the lens axis going through the centre of the lens. Define an angle between the lens axis and the path of a beam originating from the center of the lens as theta. In these ordinary lenses the focus length is in the form of a section of the surface of a sphere with the point where the axis goes through the lens as the origin of the sphere. If an image of the lens is projected on the inside surface of a sphere it will be in focus. This is because the path length that the beam follows at whatever the angle of theta will always be the same, as mentioned that being the radius of a sphere.

However, if the image is projected on a flat surface it is a different matter. If an ordinary lens is directed towards a flat surface and the lens is focused in the region on the flat surface where the beam strikes the surface perpendicularly, the image will become more out of focus the further away you move from the point where the beam strikes the flat surface perpendicularly. That is as the angle theta increases the image will become more out of focus.

The distance that the beam must travel to strike the flat surface increases as the angle of the beam between the axis of the lens and the path of the beam increases. That is as the angle theta increases the distance that the beam must travel also increases. As the path of the beam is longer it exceeds the lens's focal length. This results in an out of focus beam and image. This can be corrected with an F-theta lens. F-theta lenses are however expensive and the f-theta solution is not errors free.

In this invention however the beam is directed orthogonally direct above the target. The path to the target remains constant and the beam is always in focus. There is therefore no need for an F-theta correcting lens and money is saved.

Further, improvement of the print quality and speed is obtained by eliminating the galvanometer errors since the rotation of the motor 108 is kept at a constant speed compared to a galvanometer reversal errors and positioning errors.

This invention can be implemented in 3-D printers, material cutters, material marking and scanners of many different configurations. For example it can be implemented in printers and scanners where movements and/or controls of the system are generally based on polar coordinates relative to a centre of a build surface. Components of these types of scanners and printers may generally include a rotatable build surface; a print/scan head positioned over the build surface; a positioning system coupled to the print/scan head and configured to move the print/scan head over the build surface based on polar coordinates relative to a centre.

This invention has many further applications. For instance it can also be used to create cut-outs patterns in materials, marking of materials, sintering of materials, melting of materials, hardening of materials, engraving of materials, cladding of materials, lithographic plates and masks that can be used in the manufacture of electronics and electronic devices as for example integrated circuits. This invention could also be adapted to be used in ordinary 3-D printers with an X/Y positioning system and where the build-surface is a flat surface, displaced along the Z-axis towards and away from the print-head and the building material is deposited on the built surface and built up layer by layer.

The housing of the beam director can be made of metal, plastic acrylic, glass or any strong suitable material. The beam director rotor can be made out of a light solid material or alloy such as aluminium, wood, glass, acrylic, abs, graphite, carbon-fiber or any suitable light material. When the beam director is made of glass, clear plastic or any suitable transparent material then a rhomboid prism can be incorporated into the structure as one piece and therefore, eliminating the need for mirrors.

The reflectors are generally made of mirrors or polished material as aluminum, nickel and other suitable reflective material or prisms made of glass or plastic or similar material. The reflectors dimensions depends on the beam diameter. As an example a beam diameter of 3 mm will require a mirror size of 4.5 mm by 4.5 mm, to accommodate the beam size.

When a prism is made and cut as a rhomboid prism, the cross section dimension is generally in the order of about 50% larger than the beam diameter. Thus with a beam diameter of 3 mm a rhomboid prism with a cross section of 5 mm by 5 mm is used. The length of the rhomboid prism will determine the radius of the arc that will be printed. As can be seen in FIG. 9, in the case of a rhomboid prism with a length of 40 mm the path length of the beam 107A will be 40 mm. The radius of the arc that is printed is also 40 mm.

The motor that can be used is a brush-less direct current (bldc) motor with tachometer output or hall effect feedback in order to stabilize the rotational speed. The output of the motor is influenced on the inertia of the rotor.

The focus lens is type plano-convex or any other suitable type focus lens with focal length about 100 mm.

The dimensions of the print-head is scalable and for this particular case as shown in FIG. 1 and FIG. 2 is:
 1. Height: 130 mm.
 2. Width: 100 mm.
 3. Depth: 100 mm.
 4. Diameter of disc: 80 mm.
 5. Thickness of disc: 3 mm.

Figure 15:
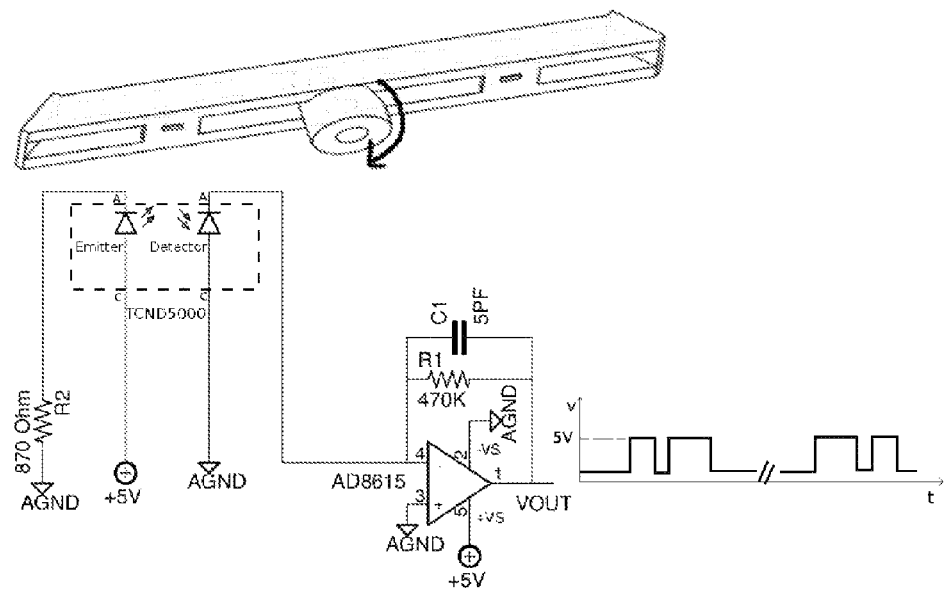
FIG. 15: shows a diagram of a simplified schematic for the index arm locator.

FIG. 15 shows how the index arm locator function is performed by using an integrated infrared emitter and detector in one package, the TCND5000 by VISHAY SEMICONDUCTOR. This is an infrared sensor detector combination that consists of a led emitter and a photo-diode. The Primary MPU (other than dedicated MPU based driver controller, discussed later) will monitor the output signals from the optics index locator. When no arm is present or when the detector faces the engraved notches 125D or 125E the output voltage will close to 0 volts and will be calculated by:

$V\text{out}=I_\text{dark\_current}*R1$ (when there is no rotor or when it is over the notch→then I dark__ current, otherwise I__ reflective when the infra-red beam of the emitter is detected by the infra-red detector) When the detector faces the arm body then the reflective surface will increase the photo diode current using the same formula:

$V\text{out}=I\_\text{reflective}*R1$

Figure 13:
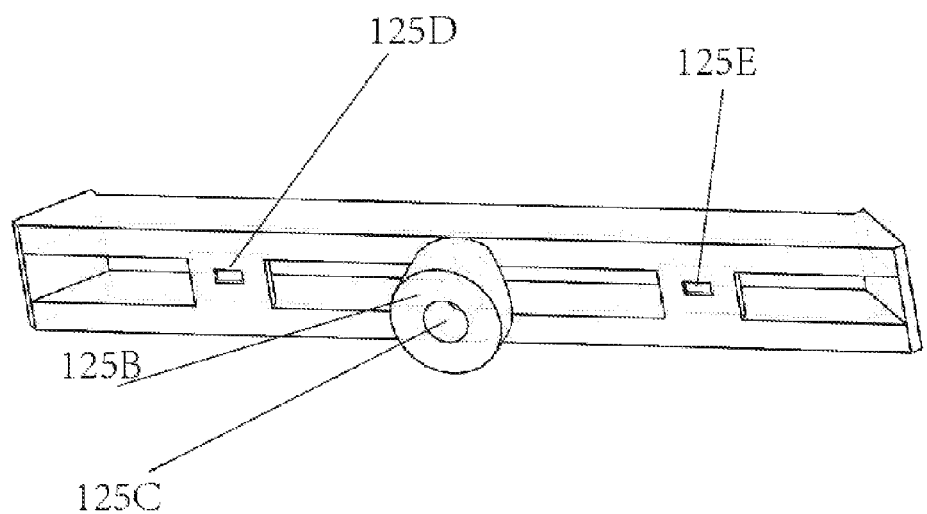
FIG. 13: shows the double arm from underneath with index holes (notches).

// Even if the surface reflects 20% of the intensity at worst
// The photo diode current will exceed 10 micro ampere
In this case Vout will be about 5+.
When the rotor (double arm in this case) is rotating, the Primary MPU will read the signals and detect the pattern for the head or for the tail. In addition, the distance in time between the pulses will provide the rotor RPM.
Calibration procedures for the Emitter and Receiver will enable a fine tuning of the monitoring of the arm by the Primary MPU overcoming data sheet specifications deviations. See reference U.S. patent application Ser. No. 14/538,924.
R2 is setting the emitter current. Chosen to 870 ohm.
C1 will reduce the noise. Chosen to 5PF; Please note: higher value for C1 may increase the respond time.
AD8615 is a low offset current opamp (operational amplifier) by ANALOG DEVICES
AGND is the circuit ground
−Vs is the AD8615 negative power supply input
+Vs is the AD8615 is the positive power supply input Although a full size rotor or one arm configuration may be employed, the double arm configuration in FIG. 12 and FIG. 13 is more stable. It reduces the inertia and provides maximum speed, is symmetrical with respect to the rotational axis and therefore more balanced. The dummy arm 125A acts as a counter balance and provides stability during rotation. It lends itself to easy fabrication out of a variety of materials such as aluminium. In FIG. 12 reflectors 106E and 106F are polished to a mirror grade and may be coated with silver to sustain high laser energy and protect against scratches.

In FIG. 13 is shown the double arm embodiment from beneath. Motor shaft socket 125C receives the shaft of motor 108. Index holes (notches) 125D and 125E are located in arms 125A and 125 respectively. They are used in combination with an index locator to determine the rotational position of the double arm.

A motor 108 BLY174S-24V-12000 from ANAHEIM AUTOMATION can be used for a double arm (125 and 125A together) with a length of 30 mm.

Figure 14:
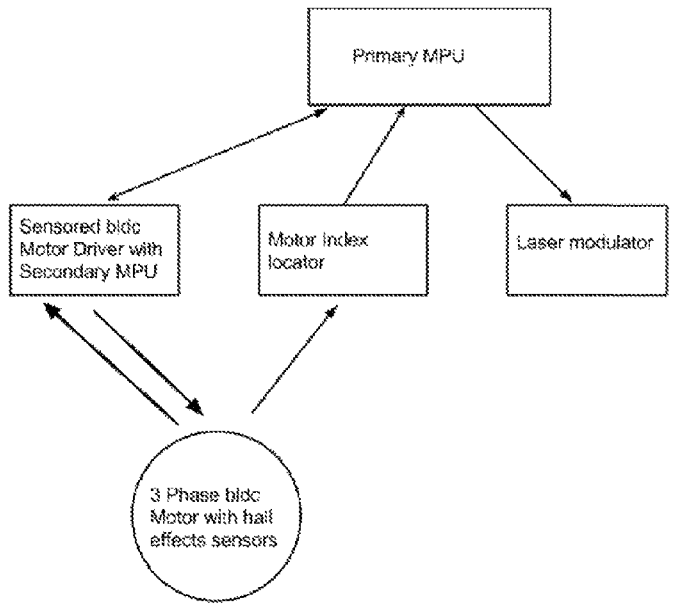
FIG. 14: shows a block diagram of how the beam director can be controlled.

As shown in FIG. 14 the selected motor is a 3 phase bldc motor with hall effect sensors for better motor speed control. The motor is connected to the sensored bldc motor driver, such that it can detect the rotational speed of the motor and control the speed of the motor. The sensored bldc motor driver is also using micro processor unit (MPU), TMS320F28069M by TEXAS INSTRUMENT, INC. This allows for closed loop speed control of the motor. The TMS320F28069M MPU also drives the DRV8312 hardware driver, made by TEXAS INSTRUMENT, INC. The TMS320F28069M is a dedicated MPU, part of the motor driver, dedicated to maintain the close loop of the motor rotations per minutes. The motor index locator is an optical emitter and detector combination in one package the TCND5000 by VISHAY SEMICONDUCTOR. This is an infrared sensor detector combination that consists of a led emitter and a photo-diode delivering a response time of about 15 nanoseconds. The optical sensor will be positioned 6 mm from the rotating rotor. The sensor will detect the presence of an arm (125 or 125A) and the index holes (notches) 125D and 125E in the arm.

As shown further in FIG. 14 the output signal of the motor index locator is connected to the primary MPU which will be read by the primary MPU. The primary MPU should be distinguished from the dedicated MPU part of the motor driver, dedicated to maintain the close loop of the motor rotations per minutes. The index locator provides the primary MPU with the rotational position of the double arm. Primary MPU is connected to the laser modulator that controls the firing of the laser. The primary MPU has a 3-D image of the object to be printed loaded in its memory. The primary MPU calculates or load a slice of the horizontal layers of the 3-D object that will be printed on top of each other to construct the 3-D object.

The primary MPU sends a signal to the sensored bldc motor driver to set the speed of the motor. It detects the position of the arm with the motor index locator. Using the location of the arm (and the X/Y location of the print head) and the specific layer that needs to be printed, of the object to be printed, it generates an output signal to the laser modulator that fires the laser.

A cheaper option will be to instead of using brush-less direct current (bldc) motor with tachometer output or hall effect feedback, is to use a stepper motor. This will eliminate the use of as discussed a sensored bldc motor driver, that can detect the rotational speed of the motor and control the speed of the motor. The stepper motor will also eliminate the need for an index locator.

Figure 16:
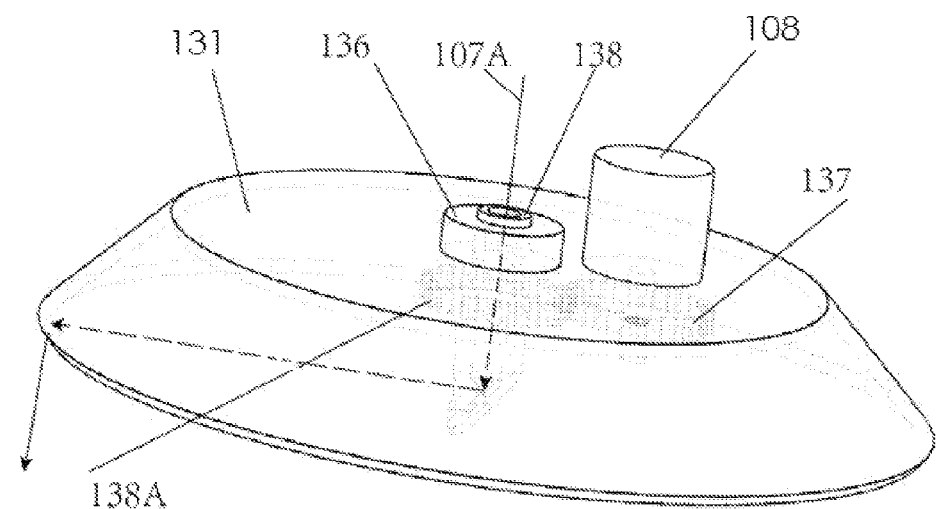
FIG. 16: shows another embodiment a slanted annular reflector enabling printing of full 360°
Figure 17:
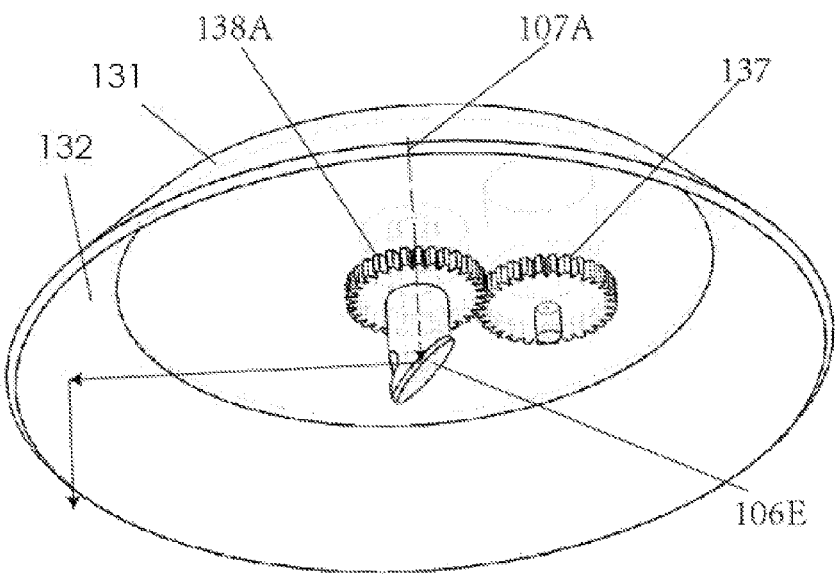
FIG. 17: shows another view of FIG. 16 in an embodiment where printing of full 360° is possible.

In FIG. 16 annular reflective reflective surface member 131 has bearing 136 at its center. Inside bearing 136 hollow shaft 138 passes through and has first mirror 106E mounted at an angle at its end as shown in FIG. 17. Bearing 136 facilitates rotation of hollow shaft 138. First mirror gear 138A meshes with motor gear 137 and is attached to hollow shaft 138A. Motor gear 137 is connected to the shaft of motor 108 as seen in FIG. 16. In operation motor 108 rotates hollow shaft 138A via meshing gears 137 and 138A. First mirror 106E rotates with hollow shaft 138A. Focusing beam 107A enters hollow shaft 138 and strikes rotating first mirror 106E which rotates beam 107A and reflects it towards slanted annular reflective surface 132 which reflects focusing beam 107A downwards towards work surface 113 as shown in FIG. 7. This embodiment makes printing of the full 360° is possible.

Figure 18:
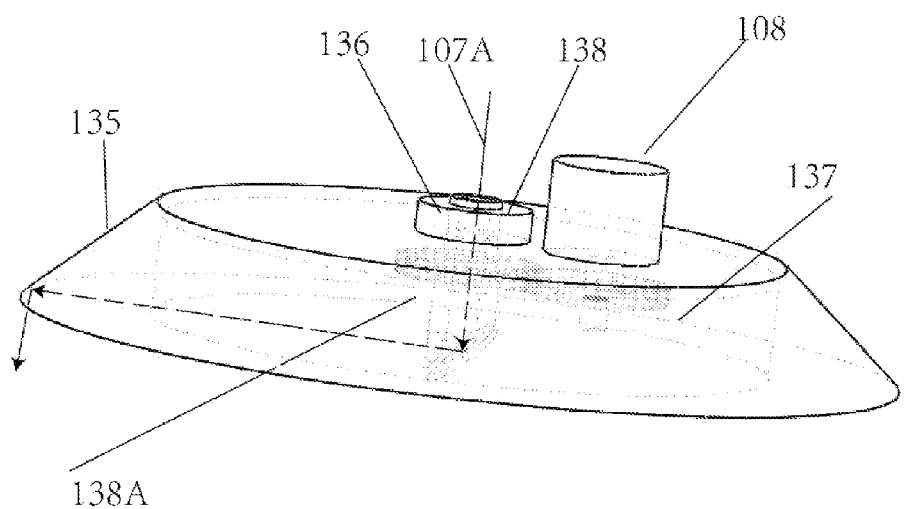
FIG. 18: shows another embodiment of a slanted annular reflector enabling printing of full 360° utilizing prism as second reflector.
Figure 19:
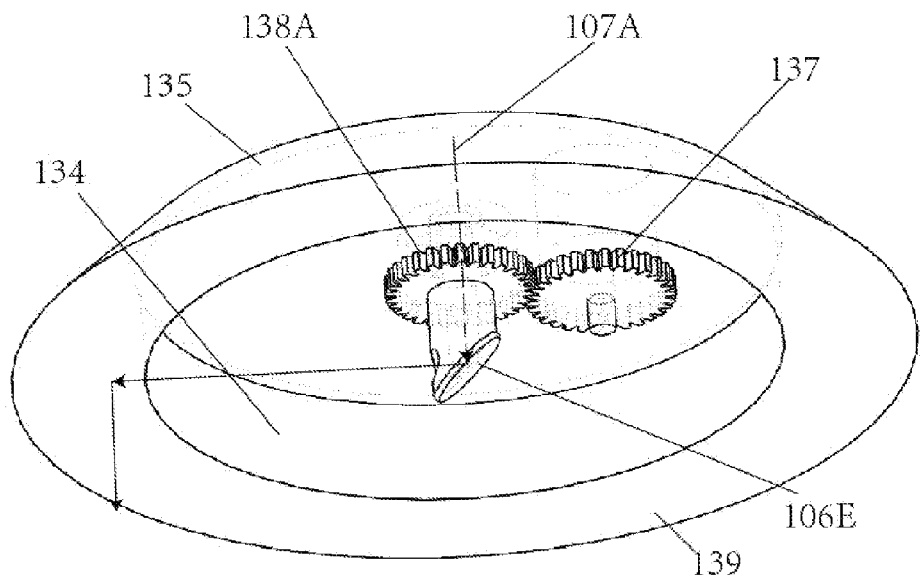
FIG. 19: shows another view of FIG. 18 in an embodiment where printing of full 360° is possible. Utilizing prism as second reflector.

In FIG. 18 annular reflective reflective surface member 131 has bearing 136 at its center. Inside bearing 136 hollow shaft 138 passes through and has first mirror 106E mounted at an angle at its end as shown in FIG. 19. Bearing 136 facilitates rotation of hollow shaft 138. First mirror gear 138A meshes with motor gear 137 and is attached to hollow shaft 138A. Motor gear 137 is connected to the shaft of motor 108 as seen in FIG. 18. In operation motor 108 rotates hollow shaft 138A via meshing gears 137 and 138A. First mirror 106E rotates with hollow shaft 138A. Focusing beam 107A enters hollow shaft 138 and strikes rotating first mirror 106E which rotates beam 107A and reflects it towards and through prism wall 134 to reflecting prism wall 135 which reflects focusing beam 107A downwards towards work surface 113 as shown in FIG. 7. This embodiment makes printing of the full 360° is possible.

Figure 20:
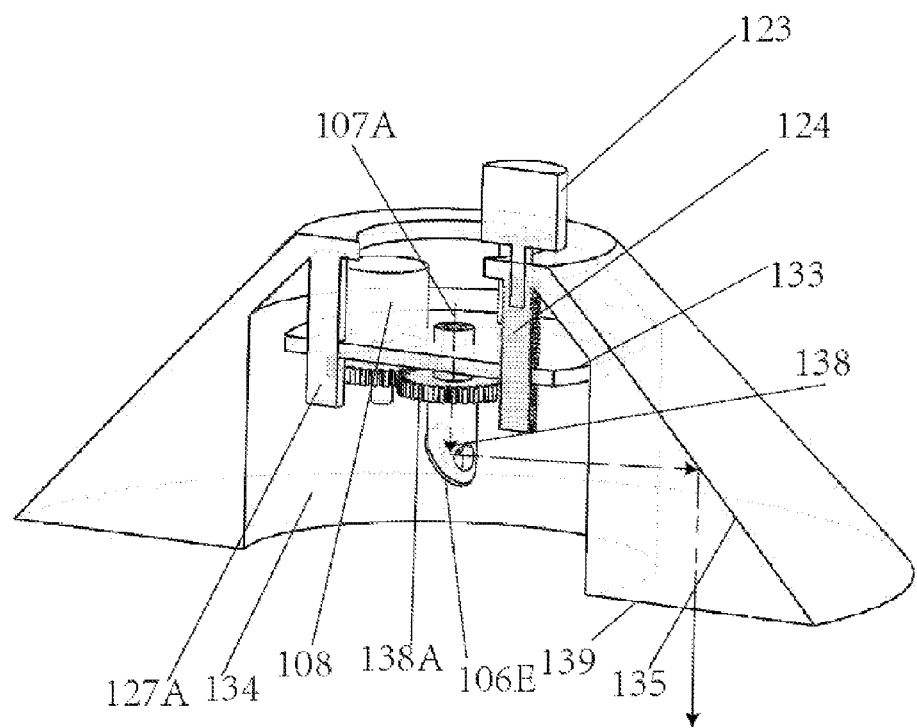
FIG. 20: shows another embodiment with cone reflector with variable radius actuator utilizing prism as second reflector and having 360° utilization.

FIG. 20 shows an embodiment similar to FIG. 11. where a 360° scanning is achieved and where the second reflector is a cone shape prism, where 107A is reflected off mirror 106E and reflected towards and through prism wall 134 then reflected off inside prism wall 135 towards and through bottom prism wall 139.

Reflectors that can used include mirrors, prisms, crystals and other reflective elements. The reflectors can also be Incorporated in the housing of an aerodynamic member to facilitate the rotation and air flow over the reflectors. An example would be that of a disk shaped housing.

Although the invention has been shown and described with respect of certain embodiments, it is obvious that equivalents and modifications will occur to others skilled in the art upon the reading and understanding of the specification. The present invention includes all such equivalents and modifications.

The invention claimed is:

1. A beam director comprising
   a rotatable first reflector configured to receive a beam from a beam source along a rotational axis of the first reflector;
   an actuator for rotating the first reflector about the rotational axis, whereby the first reflector rotates the beam and reflects the beam at a constant angle to the rotational axis; and
   a second reflector constantly facing the first reflector at a constant angle; the second reflector configured to reflect the beam towards a work surface at a constant angle thereto,
   whereby when the beam is activated and the actuator rotates the first reflector, the beam strikes the rotating first reflector rotating and reflecting the beam to the second reflector, which reflects the beam to the work surface; the beam then following a curve path relative to the work surface and traces out an arc on the work surface.

2. A beam director as in claim 1, further comprising a distance adjuster for adjusting a radial distance between the first reflector and the second reflector so that the beam follows a curved path with adjustable radii relative to the work surface and traces out arcs of adjustable radii on the work surface.

3. A beam director as in claim 1 wherein the second reflector comprises a rotationally-stationary, slanted, annular reflecting surface, encircling the first reflector; the second reflector at an angle to the rotational axis of the first reflector;
   wherein the annular reflecting surface having a large diameter and a small diameter, the large diameter directed towards the work surface
   whereby when the beam is activated and the actuator rotates the first reflector; the vertical beam strikes the rotating first reflector rotating and reflecting the beam to the annular reflecting surface of the second reflector, which reflects the beam to the work surface.

4. A beam director as in claim 1 wherein the second reflector includes a rotationally-stationary cone shaped inner surface; encircling the first reflector and having a longitudinal axis the same as the rotational axis of the first reflector; a larger diameter of the cone shaped inner surface directed towards the work surface and configured to reflect the beam from the first reflector towards the work surface;
   wherein the second reflector is vertically adjustable relative to the first reflector; whereby the distance the beam travels from the first to the second reflector is adjustable due to the conical shape of the inner surface of the second reflector so that the beam follows a curved path of adjustable radii relative to the work surface and traces out arcs of adjustable radii on the work surface.

5. A beam director as in claim 1 wherein the second reflector is configured to be rotatable by the actuator in a circle around the rotational axis of first reflector as the first reflector rotates.

6. A beam director as in claim 5, further comprising a rotor disk rotatable around the rotational axis for supporting the first and second reflectors.

7. A beam director as in claim 6, further comprising a radial slide mounted on the rotor disk for adjusting a radial distance between the first and second reflectors.

8. A beam director as in claim 5, further comprising a rotor arm rotatable around the rotational axis for supporting the first and second reflectors.

9. A beam director as in claim 8, further comprising a stabilizing arm for stabilizing the first and second reflectors.

10. A beam director as in claim 1 wherein the second reflector is configured to reflect the beam from the first reflector parallel to the rotational axis of first reflector and perpendicular to the work surface.

11. A beam director as in claim 1, further comprising an aerodynamic housing enclosing the first and second reflectors to control airflow.

12. A print head for a three dimensional printer comprising the beam director of claim 1.

13. A method of directing a beam towards a work surface with a beam director, the method comprising:
    generating a beam with a beam source;
    rotating a first reflector about a rotational axis with an actuator;
    directing the beam towards the first reflector along the rotational axis of the first reflector;
    providing a second reflector constantly facing the first reflector at a constant angle as the first reflector rotates;
    reflecting the beam with the first reflector at a constant angle to the rotational axis towards the second reflector;
    reflecting the beam with the second reflector towards a work surface;
    so that when the beam is activated and the actuator rotates the first reflector;
    the beam strikes the rotating first reflector rotating the beam and reflecting the beam to the second reflector, which reflects the beam to the work surface at a constant angle thereto; the beam then following a curved path relative to the work surface and traces out an arc on the work surface.

14. The method of claim 13 further includes adjusting the distance between the first and the second reflector so that the beam follows a curve path of adjustable radii relative to the work surface and traces out arcs of adjustable radii on the work surface.

15. The method of claim 13, wherein the second reflector comprises a slanted annular reflecting surface encircling the first reflector; being rotationally stationary and having a central axis the same as the rotational axis of the first reflector;
    wherein the annular reflecting surface includes a large diameter and a small diameter, the large diameter directed towards the work surface; so that when the beam is activated and the actuator rotates the first reflector; the vertical beam strikes the rotating first reflector rotating and reflecting the beam to the annular reflecting surface of the second reflector, which reflects the beam to the work surface; the beam then following a curve path relative to the work surface and tracing out an arc on the work surface.

16. The method of claim 13, wherein the second reflector is cone shaped;
   encircling the first reflector and including a longitudinal axis the same as the rotational axis of the first reflector;
   wherein the second reflector is rotationally stationary;
   wherein a larger diameter of the second reflector is directed towards the work surface;
   wherein the method further comprises adjusting the distance between the first and second reflectors, so that the distance the beam travels from the first to the second reflector is adjusted due to the conical shape of the second reflector; whereby the beam follows a curve path of adjustable radii relative to the work surface and traces out arcs of adjustable radii on the work surface.

17. The method of claim 13 further comprising rotating the second reflector in a circle around the rotational axis of first reflector as the first reflector rotates.

18. The method as in claim 17, further includes rotating a rotor arm supporting the first and second reflectors around the rotational axis.

19. The method as in claim 18, further includes stabilizing the rotation of first and second reflectors by attaching a stabilizing member to the rotor arm.

20. The method of claim 13 further comprising conveying the beam to the beam director with a beam conduit.

21. The method of claim 13, wherein the second reflector reflects the beam parallel to the rotational axis of first reflector and perpendicular to the work surface.

22. The method as in claim 13 further includes placing the first and second reflectors in an aerodynamic housing to control airflow.

23. The method of claim 13 further includes using the beam director as a print head for a three dimensional printer.

* * * * *